(12) United States Patent
Betts et al.

(10) Patent No.: US 7,031,381 B1
(45) Date of Patent: Apr. 18, 2006

(54) METHOD AND APPARATUS FOR REDUCING TRANSMISSION ERRORS CAUSED BY PERIODIC TRANSIENTS IN DIGITAL SUBSCRIBER LINE (DSL) COMMUNICATION SYSTEMS

(75) Inventors: William Lewis Betts, St. Petersburg, FL (US); Rafael Martinez, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 974 days.

(21) Appl. No.: 09/638,924

(22) Filed: Aug. 15, 2000

Related U.S. Application Data

(60) Provisional application No. 60/161,741, filed on Oct. 27, 1999.

(51) Int. Cl.
*H04B 17/00* (2006.01)
*H04Q 1/20* (2006.01)

(52) U.S. Cl. ............... 375/225; 375/226; 375/227; 375/228

(58) Field of Classification Search ........... 375/222, 375/223, 225; 370/465; 379/93.01, 93.28, 379/93.33
See application file for complete search history.

(56) References Cited

U.S. PATENT DOCUMENTS

| 3,935,392 | A | * | 1/1976 | Smith et al. ............... 379/386 |
| 4,620,294 | A | * | 10/1986 | Leung et al. ............... 375/222 |
| 4,771,417 | A | * | 9/1988 | Maxwell et al. ............ 370/296 |
| 5,473,676 | A | * | 12/1995 | Frick et al. ............. 379/93.09 |
| 5,517,548 | A | * | 5/1996 | Engelke et al. ............... 379/52 |
| 5,805,669 | A | * | 9/1998 | Bingel et al. ................. 379/28 |
| 6,351,533 | B1 | * | 2/2002 | Parrott ....................... 379/412 |
| 6,487,243 | B1 | * | 11/2002 | Hwang et al. ............ 375/222 |
| 6,553,062 | B1 | * | 4/2003 | Marum ....................... 375/222 |
| 6,574,236 | B1 | * | 6/2003 | Gosselin et al. ............ 370/465 |
| 6,574,315 | B1 | * | 6/2003 | Biedermann et al. .... 379/93.33 |

* cited by examiner

*Primary Examiner*—Jean B. Corrielus
*Assistant Examiner*—Qutub Ghulamali
(74) *Attorney, Agent, or Firm*—Thomas, Kayden, Horstemeyer & Risley LLP

(57) ABSTRACT

A transient pre-emptor includes a processor configured to detect transients in a communications system. After the processor detects a transient in the communications system, it causes a data communications equipment to suspend or reduce data transmission during the occurrence of a subsequent transient.

22 Claims, 3 Drawing Sheets

METHOD AND APPARATUS FOR REDUCING TRANSMISSION ERRORS CAUSED BY PERIODIC TRANSIENTS IN DIGITAL SUBSCRIBER LINE (DSL) COMMUNICATION SYSTEMS

CROSS-REFERENCE TO RELATED APPLICATIONS

This application claims the benefit of U.S. Provisional Application No. 60/161,741, filed Oct. 27, 1999 (61607-1260; 1999-13), and U.S. Utility application Ser. No. 09/395,020 filed Sep. 13, 1999 (61607-1230; 1999-07), which are both also hereby incorporated by reference herein in their entirety.

TECHNICAL FIELD

The present invention generally relates to communication systems and, more particularly, to a method and apparatus for reducing transmission errors caused by periodic transients in digital subscriber line (DSL) communication systems.

BACKGROUND OF THE INVENTION

In networks that utilize copper pairs, also referred to as metallic loops or twisted wire pairs, baseband telephony services and DSL services are often provided over the same copper pair. In these types of networks, transients associated with baseband ringing used to signal incoming call requests can result in the occurrence of bit errors data being transmitted with DSL technology. Most if not all DSL systems are susceptible to such transients.

Plain old telephone service (POTS) filters or splitters are widely used to separate the baseband telephony services, which occupy lower frequencies (i.e., typically below about 4 kilohertz (kHz)), from the higher data frequencies associated with DSL services. POTS filters normally filter out signals above about 20 kHz so that noise in the baseband does not adversely affect the DSL transmissions. However, even where POTS filters are utilized, it has been determined that periodic transients are sufficiently powerful to couple from adjacent wires resulting in impulse noise and bit errors in data being transmitted at the higher DSL data rates. DSL communications equipment may also employ powerful block codes and interleavers to disperse the transient. These methods have undesirable complexity and result in significantly slower data transmission rates. Accordingly, a need exists for a method and apparatus for reducing the number of bit errors that occur as a result of periodic transients in DSL data transmission.

SUMMARY OF THE INVENTION

The present invention provides an apparatus and method for reducing transmission errors in a communications system. The apparatus, a transient pre-emptor, comprises a processor configured to detect transients. After the processor detects a transient in the communications system, it causes communications equipment to suspend or reduce data transmission during the occurrence of a subsequent transient.

The present invention can also be viewed as providing a method for reducing transmission errors. In this regard, the method can be broadly summarized by the following steps: detecting a transient in the communications system and suspending or reducing the data transmission rate between data communications equipment during the occurrence of a subsequent transient.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

Figure 1:
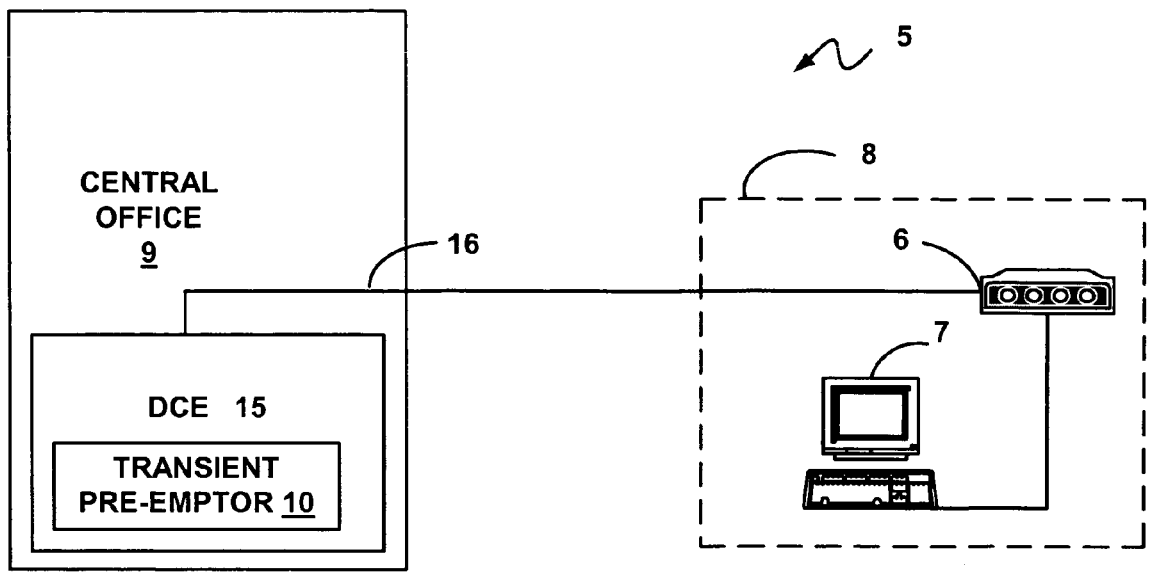
FIG. 1 is an illustration of a network that utilizes a copper pair for communicating baseband telephony services and DSL data services between a central office and a subscriber, or customer, premises.

FIG. 1 illustrates a communications network 5 utilized for communicating baseband telephony services and DSL services over a copper pair 16. The network 5 comprises a central office (CO) 9, which is coupled by a copper pair 16 (also known as a subscriber loop) to a customer premises (CP) 8. The network 5 may be, for example, but not limited to, part of the public switched telephone network (PSTN). The CO 9 comprises a data communications equipment (DCE) 15 that is electrically coupled via the copper pair 16 to a DCE 6 located at the CP 8. The DCE 6 located at the CP 8 is in communication with a data terminal equipment (DTE) device 7, which may be, for example, but not limited to, a personal computer, a workstation, a minicomputer, or a mainframe computer.

For ease of illustration, only one CP 8 is shown in FIG. 1. Typically, many CPs 8 will be electrically coupled to the CO 9 by the copper pair 16. Also, the CO 9 normally comprises many DCEs 15 for communicating with many subscribers. For ease of illustration, only one of the DCEs located at the CO 9 is shown in FIG. 1. Also, it should be noted that the DCE 15 located at the CO 9 typically communicates via copper pair 16 with multiple customer premises DCEs. In order to clearly demonstrate the concepts of the present invention, the present invention will be discussed with reference to communication between a single DCE 15 located at the CO 9 and a single DCE 6 located at the CP 8. Those skilled in the art will understand the manner in which multiple instances of the transient pre-emptor may be implemented in a network such as that shown in FIG. 1.

In accordance with the preferred embodiment of the present invention, the transient pre-emptor 10 is situated in the DCE 15 located in the CO 9. The transient pre-emptor 10 is capable of detecting transients on the copper pair and of causing the rate(s) of data transmission to be reduced to a predetermined rate upon detecting transients. This predetermined rate of data transmission is utilized by both the DCE 15 located at the CO 9 and by the DCE 6 located at the CP 8. Therefore, preferably the transient pre-emptor 10 is incorporated into the DCE 15 located at the CO 9 since the DCE 15 typically is provided with the capability of commanding the customer premises DCE to adjust its rate(s) of data transmission.

However, those skilled in the art will understand that the DCE 6 located at the CP 8 could be configured to adjust its own rate(s) of data transmission upon detecting transients. The customer premises DCE 6 could also be configured to send a command to the DCE 15 located at the CO 9 that would cause the DCE 15 located at the CO 9 to adjust its rate(s) of data transmission. Therefore, it will be understood that the present invention is not limited with respect to the location at which the transient pre-emptor 10 is physically implemented.

Figure 2:
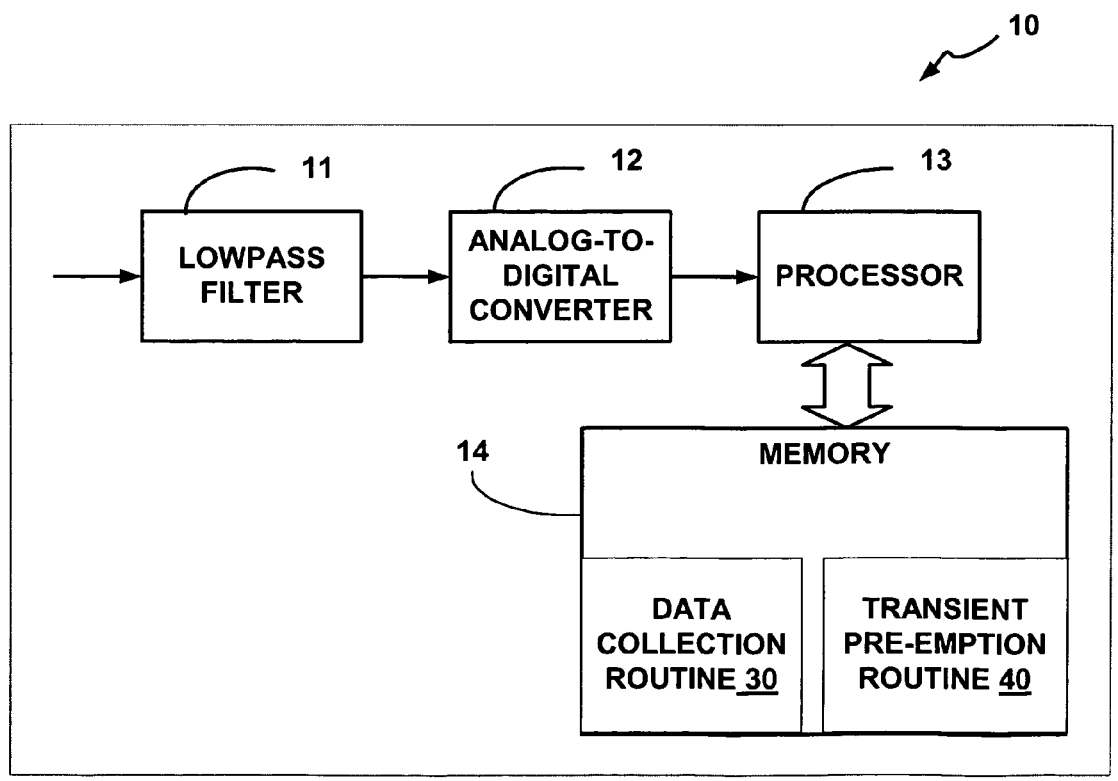
FIG. 2 is a functional block diagram of a transient pre-emptor in accordance with the preferred embodiment of the present invention.

FIG. 2 is a functional block diagram of the transient pre-emptor 10 of the present invention in accordance with the preferred embodiment. The transient pre-emptor 10 of the present invention preferably comprises a low-pass filter 11, an analog to digital converter 12, a processor 13, and memory 14. The processor 13 is preferably a digital signal processor, but may also be a general purpose processor, a specific purpose processor, or a hardware component capable of executing instructions or performing electronic computations. The processor 13 is also preferably the CPU of the DCE 15 located at the CO 9. However, a separate processor may be utilized for performing the method of the present invention, as will be understood by those skilled in the art. Memory 14 may include volatile and/or non-volatile memory and may comprise one or more components selected from a wide variety of memory hardware such as, for example, RAM, ROM, or a combination thereof.

The low-pass filter 11 separates telephony baseband signals from DSL signals and passes the telephony baseband signals to an analog-to-digital converter (ADC) 12. The baseband telephony signals normally have a frequency that is below 4 kilohertz. The baseband ringing wave form is an analog waveform that is within this frequency range, but is at a much higher voltage level than the voltage levels of other baseband telephony signals being transmitted over the network, including the on-hook and off-hook voltage levels.

Typically, the baseband ringing waveform that causes the transients has a voltage level that is approximately 200 volts peak-to-peak and has short-duration rise and fall time. The ADC 12 receives this waveform and converts it into digital signals, which are then delivered to the processor 13. The processor 13 monitors the digital signals received from the ADC 12 to determine whether the a digital signal corresponds to a transient. A digital signal corresponds to a transient if it has a short duration rise or fall time and covers a sufficiently wide range of values. If the processor detects a transient, it stores information about its timing, duration and magnitude in memory 14.

It should be noted that there are a variety of known ways to detect transients. The present invention is not limited with respect to the manner in which this is accomplished. Preferably, transients are detected in the manner discussed above by utilizing the low-pass filter 11, the ADC 12 and the processor 13 in the aforementioned manner. However, those skilled in the art will understand that this may be accomplished by utilizing other techniques and devices.

Figure 3:
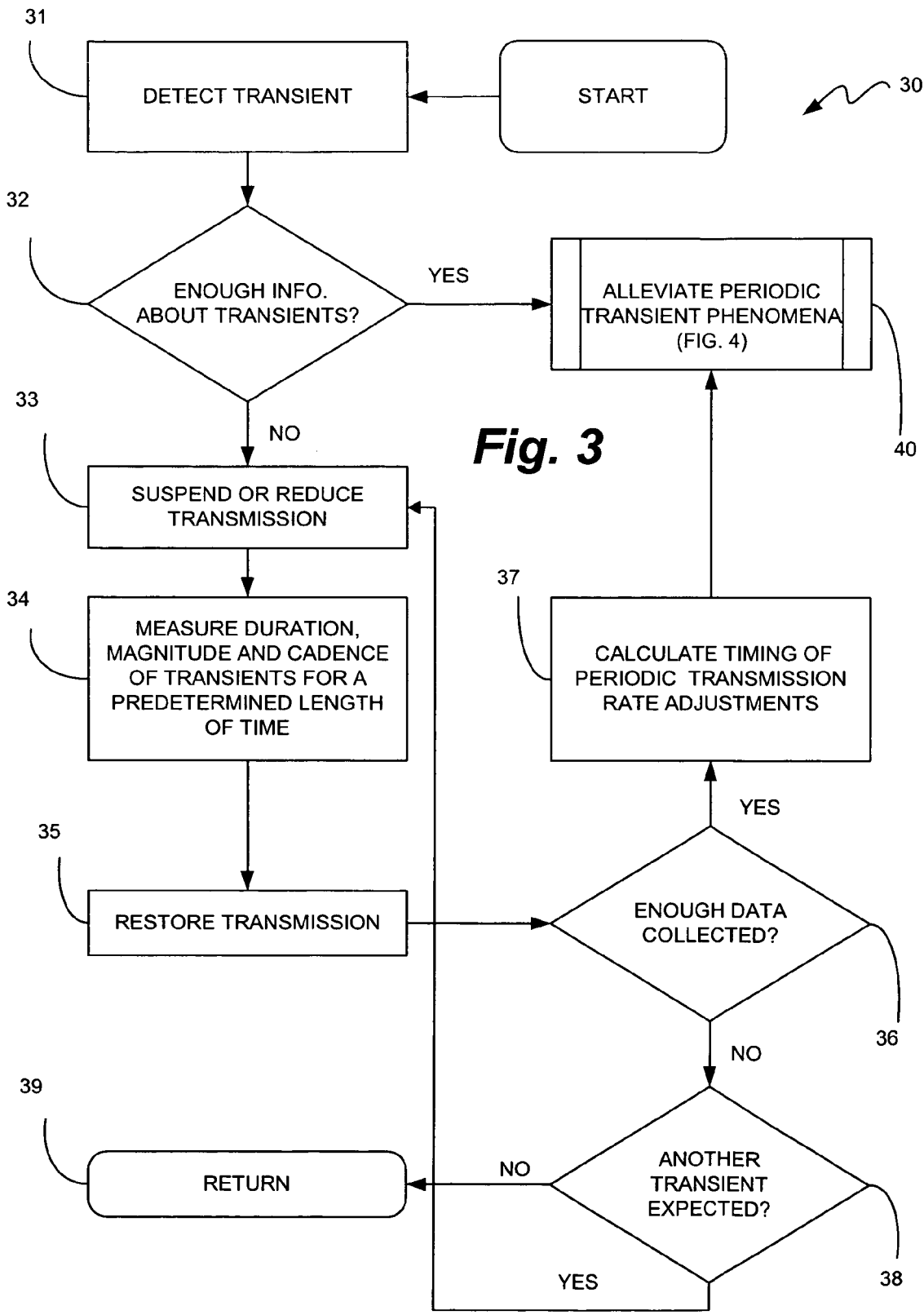
FIG. 3 is a flow chart of a data collection routine executed by the transient pre-emptor shown in FIG. 2 to collect data about periodic transients.

FIG. 3 is a flow chart of a data collection routine executed by the transient pre-emptor 10 (shown in FIG. 2) to collect data about periodic transients. After an initial transient is detected at block 31, the processor 13 (FIG. 2) determines whether enough information about periodic transients had been previously collected and stored in memory 14. If so, the processor 13 (FIG. 2) executes the routine 40 shown in FIG. 4, and discussed in more detail below. Otherwise, the processor 13 suspends or reduces data transmission, as indicated in block 33, between the DCE 15 located at the CO 9 and the DCE 6 located at the CP 8 (FIG. 1). The preferred course of action is to cease transmission until enough data about the periodic transients are collected. However, if the disturbance caused by the initial transient is minor, then the data transmission rate may be reduced to the highest possible rate that will be immune to further transients of similar intensity.

A suspension or reduction in data transmission is preferably achieved in a two step process—first the downstream data transmission rate is adjusted and then the upstream data transmission rate is adjusted. Once the data transmission rates are appropriately modified, subsequent transients are monitored as indicated in block 34. The processor 13 monitors transient by measuring the duration, magnitude and cadence of transients over a predetermined length of time that is calculated to span the occurrence of several transients. Measurements made by the processor 13 are stored in memory 14 (FIG. 2). When the predetermined length of time expires, transmission rates are restored to their original values as indicated by block 35. The restoration of the original transmission rates is preferably achieved in a two step process—first the downstream data transmission rate is restored and then the upstream data transmission is restored.

The processor 13 (FIG. 2) then processes the data stored in memory 14 to determine if enough data has been collected on transients (block 36). If enough data has been collected then, as indicated in block 37, the processor 13 calculates the timing of the periodic transmission rate adjustments that will be made in anticipation of future transients, and then executes the routine 40 that will be discussed in more detail below. Otherwise, if not enough data has been collected, the processor 13 determines, as indicated in block 38, based on the cadence of the transients and the number of transients detected, whether another transient is expected. If another transient is expected, then processor 13 re-executes the steps indicated in blocks 33, 34, 35, and 36 as described above. If no further transients are expected as part of the series of periodic transients measured according to block 34, then the routine 30 terminates and returns to the point of execution from which it was called, as indicated by block 39.

Figure 4:
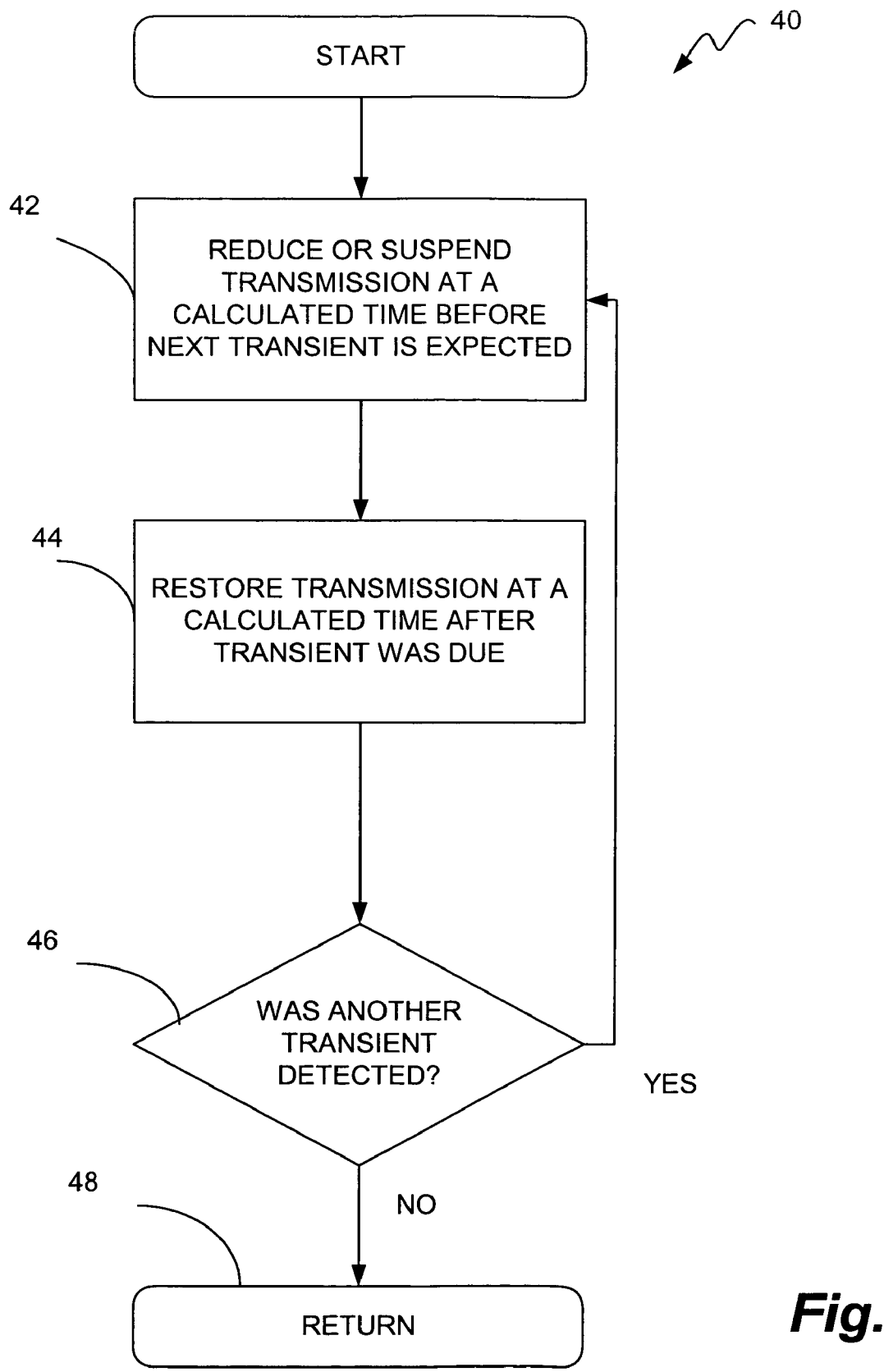
FIG. 4 is a flow chart of a transient pre-emption routine executed by the transient pre-emptor shown in FIG. 2 to alleviate periodic transient phenomena.

FIG. 4 is a flow chart of a transient pre-emption routine executed by the present invention shown in FIG. 2 to alleviate periodic transient phenomena. As indicated in block 42, the processor 13 (FIG. 2) suspends or reduces data transmission between the DCE 15 and the DCE 6 at a calculated time before the next transient is expected. The time that a subsequent transient is expected to occur can be determined by the processor 13 from the information gathered from executing the routine shown in FIG. 3 and stored in memory 14 (FIG. 2).

The calculated time when transmission is to be suspended or reduced depends on several factors. These factors include: the variability of the cadence intervals of the transients, the time that it takes to transmit a pending message, the maximum time that it takes to receive the longest response message, and the time it takes to transmit rate reduction commands. These factors can be stored in memory 14 (FIG. 2) and used by the processor 13 to help determine when transmission is to be suspended or reduced. As a non-limiting example, in one communications system, it was determined that suspending transmission and polling by the DCE 15 (FIG. 1) about 50 msec before the next expected transient produced the best results. It should be noted that the optimal time period also depends on the accuracy of the cadence measurement, and on the transient response of the system filters and will therefore vary among communications systems. A suspension or reduction in data transmission is preferably achieved in a two step process—first the downstream data transmission rate is adjusted and then the upstream data transmission rate is adjusted. The preferred course of action is to suspend transmission during transients. However, if the transients are not too severe, then the data rate may be reduced to the highest possible rate that will be immune to additional transients of similar intensity.

After data transmission is reduced or suspended, it is restored at a calculated time after the subsequent transient is expected to have occurred, as indicated in block 44. The time that a subsequent transient is expected to have occurred can be determined by the processor 13 (FIG. 2) from the cadence information gathered by executing the routine shown in FIG. 3 and stored in memory 14 (FIG. 2). As a non-limiting example, in one communications system, it was determined that resuming polling 3 msec after the transient was expected to have occurred helped achieve the best performance. The optimal time period, however, depends on the variability of the transient cadence interval, on the accuracy of the cadence measurement, and on the transient response of the system filters, and will therefore vary among communication systems. In general, the longer the time period during which transmission is reduced or suspended, the greater the probability of alleviating disturbances caused by a transient.

As an alternative approach to the step in block 44, the processor 13 (FIG. 2) would cause transmission to be restored only after a subsequent transient is detected or after failing to detect a subsequent transient for a predetermined period of time. This alternative approach ensures that variability in the cadence or in the measurements thereof will not result in transmission being restored prior to the occurrence of the anticipated transient. In addition, by continuing to measure the timing, duration, and cadence of transients, the process can be tuned to better predict and alleviate subsequent transients. The tuning can be achieved, for example, by revising the estimated time between transients.

The restoration of the original data rates is preferably achieved in a two step process—first, the downstream data transmission rate is restored and then the upstream data transmission rate is restored. After the transmission rates are restored to their original values, the processor 13 (FIG. 2) determines if, as indicated in block 46, a transient was detected during the time that the transmission was suspended or reduced. If the processor 13 determines that a transient was detected, then the processor 13 re-executes the steps indicated in blocks 42, 44, and 46 as explained above in order to protect against additional transients. These steps would continue to be executed as long as additional transients continue to be detected. If no further transients are detected for a predetermined period of time, then the routine 40 terminates and returns to the point of execution from which it was called, as indicated by block 48.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Routines 30 & 40 can be implemented in a computer program which comprise an ordered listing of executable instructions for implementing logical functions. Such a program can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The apparatus and/or method of reducing transmission errors of the present invention can be implemented in hardware, software, firmware, or a combination thereof. In the preferred embodiment(s), the method of reducing transmission errors is implemented in software or firmware that is stored in a memory and that is executed by a suitable instruction execution system. If implemented in hardware, as in an alternative embodiment, the method of reducing transmission errors can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, are merely possible examples of the implementations, merely setting forth for a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Having thus described the invention, the following is claimed:

1. A method for reducing transmission errors in a data communications equipment having a current transmission rate, the method comprising the steps of:

detecting a transient;

responsive to the detecting, collecting data describing one or more subsequent transients that occur over a first predetermined length of time;

determining, based on the collected data, a second time for rate adjustment; and at the second time, reducing the current transmission rate from a first rate.

2. The method claim 1, wherein the data comprises at least one of transient timing, transient duration, and transient rate.

3. The method of claim 1, wherein the determining step bases the second time on variability of a cadence interval of the transient.

4. The method of claim 1, further comprising the step of:
responsive to the detecting, reducing the current transmission rate from a second rate.

5. The method of claim 4, further comprising the step of:
after the collecting step, restoring the current transmission rate to the second rate.

6. The method of claim 1, further comprising the step of:
at a third time, restoring the current transmission rate to the first rate, the third time based on an expected time of a next transient occurrence.

7. The method of claim 1, wherein the determining step bases the second time on at least one of a maximum duration of transmission of a pending message, a maximum duration for receiving a longest response message, and a duration of transmission of a rate reduction command.

8. A computer readable medium having a program for reducing transmission errors in a data communications equipment having a current transmission rate, the program comprising logic for performing the steps of:
detecting a transient;

responsive to the detecting, collecting data describing one or more subsequent transients that occur over a first predetermined length of time;

determining, based on the collected data, a second time for rate adjustment; and at the second time, reducing the transmission rate or suspending transmission.

9. The computer readable medium of claim 8, wherein the data comprises at least one of transient timing, transient duration, and transient rate.

10. The computer readable medium of claim 8, wherein the determining step bases the second time on variability of a cadence interval of the transient.

11. The computer readable medium of claim 8, further comprising the step of:
responsive to the detecting, reducing the transmission rate from a second rate.

12. The computer readable medium of claim 11, further comprising the step of:
after the collecting step, restoring the transmission rate to the second rate.

13. The computer readable medium of claim 8, further comprising the step of:
at a third time, restoring the transmission rate to the first rate, the third time based on an expected time of a next transient occurrence.

14. The computer readable medium of claim 8, wherein the determining step bases the second time on at least one of a maximum duration of transmission of a pending message, a maximum duration for receiving a longest response message, and a duration of transmission of a rate reduction command.

15. A method for reducing transmission errors in a data communications equipment having a current transmission rate, the method comprising the steps of:
detecting a transient;

collecting data, responsive to the detecting, said data characterizing one or more subsequent transients that occur during a predetermined period;

determining, based on the collected data, a rate adjustment time; and adjusting, at the rate adjustment time, the current transmission rate of the data communications equipment.

16. The method of claim 15, wherein the collected data comprises at least one of transient timing, transient duration, and transient rate.

17. The method of claim 15, further comprising the steps of:
determining, based on the collected data, an expected occurrence time of a subsequent transient start; and reducing, at the expected occurrence time of the subsequent transient start, the current transmission rate of the data communications equipment.

18. The method of claim 17, wherein the determining step bases the expected occurrence time on variability of a cadence interval of the transient.

19. The method of claim 17, wherein the determining step bases the expected occurrence time on at least one of a maximum duration for transmission of a pending message, a maximum duration for receiving a longest response message, and a duration of transmission of a rate reduction command.

20. The method of claim 15, further comprising the steps of:
determining, based on the collected data, an expected occurrence time of a subsequent transient end; and restoring, at the expected occurrence time of the subsequent transient end, the current transmission rate of the data communications equipment.

21. The method of claim 20, wherein the determining step bases the expected occurrence time on variability of a cadence interval of the transient.

22. The method of claim 20, wherein the determining step bases the expected occurrence time on at least one of a maximum duration for transmission of a pending message, a maximum duration for receiving a longest response message, and a duration of transmission of a rate reduction command.

* * * * *